US009411771B2

(12) United States Patent
Huang

(10) Patent No.: US 9,411,771 B2
(45) Date of Patent: Aug. 9, 2016

(54) SERVER SYSTEM FOR SWITCHING MASTER AND SLAVE DEVICES

(71) Applicants: Inventec (Pudong) Technology Corporation, Shanghai (CN); INVENTEC CORPORATION, Taipei (TW)

(72) Inventor: Lan Huang, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 364 days.

(21) Appl. No.: 14/146,011

(22) Filed: Jan. 2, 2014

(65) Prior Publication Data

US 2015/0113187 A1 Apr. 23, 2015

(30) Foreign Application Priority Data

Oct. 22, 2013 (CN) .......................... 2013 1 0502882

(51) Int. Cl.
*G06F 13/12* (2006.01)
*G06F 11/00* (2006.01)
*G06F 13/42* (2006.01)
*G06F 11/07* (2006.01)

(52) U.S. Cl.
CPC ........ *G06F 13/4291* (2013.01); *G06F 11/0745* (2013.01)

(58) Field of Classification Search
CPC .......................... G06F 13/4291; G06F 11/0745
USPC ......................................................... 710/110
See application file for complete search history.

(56) References Cited

U.S. PATENT DOCUMENTS

| 7,721,155 | B2* | 5/2010 | Holdaway | ........... | G06F 11/0745 |
| | | | | | 714/43 |
| 7,849,244 | B2* | 12/2010 | Huang | ................ | G06F 13/4291 |
| | | | | | 710/110 |
| 2005/0091438 | A1* | 4/2005 | Chatterjee | ............. | G06F 13/409 |
| | | | | | 710/315 |
| 2007/0240019 | A1* | 10/2007 | Brady | ................. | G06F 13/4291 |
| | | | | | 714/43 |
| 2015/0046746 | A1* | 2/2015 | Messer | ............... | G06F 11/0745 |
| | | | | | 714/5.1 |

FOREIGN PATENT DOCUMENTS

TW 201216079 4/2012

* cited by examiner

*Primary Examiner* — Titus Wong
(74) *Attorney, Agent, or Firm* — CKC & Partners Co., Ltd.

(57) ABSTRACT

A server system includes a baseboard management controller and calculation modules. Each calculation module includes a system on chip, slave devices and a switch. The switch is connected with the baseboard management controller, the system on chip and the slave devices. The switch issues an address selection signal to select one of the slave devices to be connected with the switch. The switch switches the baseboard management controller and the system on chip to be connected with one of the slave devices by a control signal.

10 Claims, 3 Drawing Sheets

SERVER SYSTEM FOR SWITCHING MASTER AND SLAVE DEVICES

RELATED APPLICATIONS

This application claims priority to Chinese Application Serial Number 201310502882.7, filed Oct. 22, 2013, which is herein incorporated by reference.

BACKGROUND

1. Field of Invention

The invention relates to a server system, and particularly relates to a server system that may select a master device in an I2C bus.

2. Description of Related Art

There are many types of bus used in a server system, such as a parallel bus and a serial bus.

Typically, a parallel bus transfers multiple hits simultaneously, which contrasts with a serial bus that transfers a single bit at a time. Concerning the bus architecture, the parallel bus has more electrical conductors to transfer bits than that in the serial bus between integrated circuits. Therefore, the circuit structure of the parallel bus is complicated. An I2C (Inter-Integrated Circuit) bus is a serial bus for providing communication between integrated circuits. The I2C bus uses only two bidirectional lines to transfer data, so as to reduce the complexity of the circuit structure. Moreover, the I2C bus is a multi-master bus, which allows a plurality of master devices in the bus.

Therefore, there is a demand for a user to select a slave device to be connected with a master device in the I2C bus.

SUMMARY

Accordingly, the present invention provides a server system that can select one of the master devices for each slave device to perform a function process.

The invention provides a server system including a baseboard management controller and calculation modules. Each calculation module includes a system on chip, slave devices and a switch. The switch is connected with the baseboard management controller, the system on chip and the slave devices. The switch transfers an address included signal to select one of the slave devices to be connected with the switch. The switch switches between the baseboard management controller and the system on chip to be connected with one of the slave devices by a control signal.

In an embodiment, one of the slave devices is a memory, and when the server is on standby power status the baseboard management controller receive data in the memory through the switch, and when the server is powered on the switch switches the system on chip to receive data in the memory.

In an embodiment, one of the slave devices is a network interface controller, the baseboard management controller monitors the temperature of the network interface controller, and the switch switches the system on chip to access the temperature of the network interface controller.

In an embodiment, one of the slave devices is a voltage regulator, the voltage regulator supplies power to the system on chip and the system on chip accesses a voltage value of the voltage regulator, and the switch switches the baseboard management controller to monitor the temperature of the voltage regulator.

In an embodiment, the server system further comprises a demultiplexer. The baseboard management controller is connected with the calculation modules through the demultiplexer.

In an embodiment, the switch is a multiplexer.

In an embodiment, the baseboard management controller or the system on chip transfer the address included signal to the switch.

In an embodiment, the switch is connected with the baseboard management controller, the system on chip and the slave devices respectively by I2C bus.

In an embodiment, the baseboard management controller and the system on chip are master devices.

In an embodiment, the control signal is provided by the baseboard management controller or system on chip.

Accordingly, the slave devices are connected to the master devices through a switch. By switching the switch, different master devices are selected to be connected with the slave devices respectively. Therefore, different functions are performed for the master devices.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
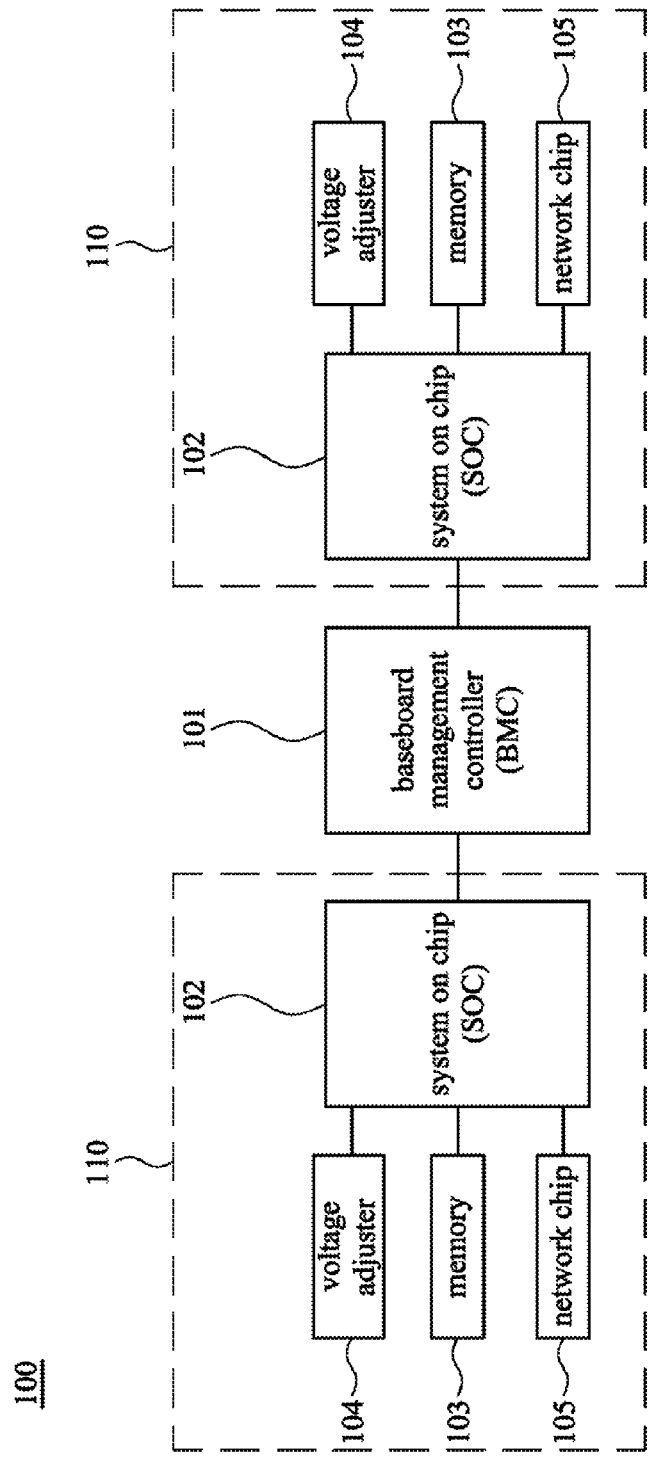
FIG. 1 illustrates a schematic view of a server system.

Reference will now be made in detail to the present embodiments of the invention, examples of which are illustrated in the accompanying drawings. Wherever possible, the same reference numbers are used in the drawings and the description to refer to the same or like parts.

FIG. 1 illustrates a schematic view of a server system. A server system 100 includes a baseboard management controller (BMC) 101 and a plurality of calculation modules 110. Each calculation module 110 includes a system on chip (SOC) 102 and a plurality of slave devices, including a memory 103, a voltage regulator 104 and a network interface controller 105. The memory 103, the voltage regulator 104 and the network interface controller 105 are connected to the SOC 102 through an I2C bus. The memory 103 provides configuration information for SOC 102 and BMC 101. The voltage regulator 104 provides kernel voltage for the SOC 102. The network interface controller 105 helps the SOC 102 to be connected to the network.

When the server 100 is powered on, the SOC 102 accesses the configuration information in the memory 103, the memory 103 include serial presence detect (SPD) to stores the configuration information of the memory, for example, the capacity, the chip manufacturer, memory module manufacturer and working speed. Accordingly, the memory 103 is a slave device of an I2C bus, and the SOC 102 is a master device of an I2C bus and transfer. On the other hand, the BMC 101 also needs to access the configuration information of the memory 103 to control the server 100 when the server 100 is on standby power status. Accordingly, the memory 103 is a slave device of an I2C bus, and the BMC 101 is a master device of an I2C bus. Moreover, when the voltage regulator 104 provides kernel voltage to the SOC 102 the SOC 102 may get parameter value of the voltage regulator 104. Accordingly, the voltage regulator 104 is a slave device of an I2C bus, and the SOC 102 is a master device of an I2C bus. The BMC 101 needs to monitor the temperature of the voltage regulator 104 after the server 100 is powered on. Accordingly, the voltage regulator 104 is a slave device of an I2C bus, and the BMC 101 is a master device of an I2C bus. On the other hand, when the network interface controller 105 is in working, the SOC 102 accesses the temperature and parameter values of the network interface controller 105. Accordingly, the network interface controller 105 is a slave device of an I2C bus, and the SOC 102 is a master device of an I2C bus. At the same time, the BMC 101 monitors the temperature of the network interface controller 105. Accordingly, the network interface controller 105 is a slave device of an I2C bus, and the BMC 101 is a master device of an I2C bus. In other words, in an I2C bus connection structure, each of the memory 103, the voltage regulator 104 and the network interface controller 105 may work as a slave device for the BMC 101 or the SOC 102 to perform a function. Accordingly, for performing different function processes for the BMC 101 or the SOC 102, a switch is used to select the master device in a server.

Figure 2:
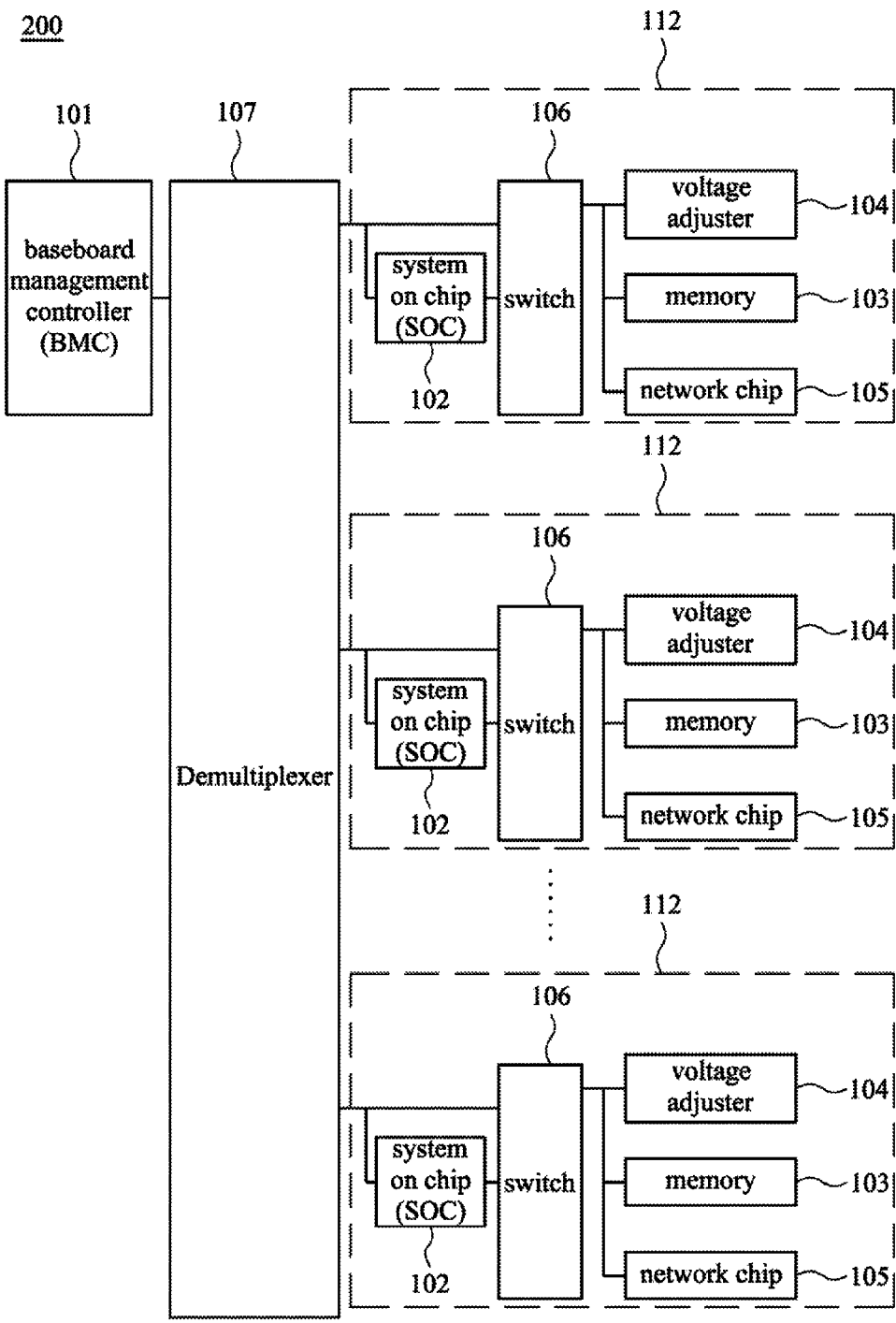
FIG. 2 illustrates a schematic view of a server system according to an embodiment of the invention.

FIG. 2 illustrates a schematic view of a server system according to an embodiment of the invention. The server system 200 includes a baseboard management controller (BMC) 101 and a plurality of calculation modules 112. Each calculation module 112 includes a system on chip (SOC) 102, a switch 106 and a plurality of slave devices, including a memory 103, a voltage regulator 104 and a network interface controller 105. The switch 106 is connected with the memory 103, the voltage regulator 104, and the network interface controller 105 use the same one I2C bus port, the SOC 102 use one separate I2C bus port and the BMC 101 use another separate I2C bus port. That is, the memory 103, the voltage regulator 104, the network interface controller 105 are connected to the SOC 102 and the BMC 101 through the switch 106. By using the control signal to switch the master I2C device between the SOC 102 and the BMC 101 in the switch 106, the memory 103, the voltage regulator 104 or the network interface controller 105 use the I2C bus include address signal feature to be connected to one of the SOC 102 and the BMC 101 to work as a slave device to perform a function process. The control signal is provided by the BMC 101 or SOC 102.

In an embodiment, the BMC 101 or the SOC 102 transfers an address included signal to the switch 106. The switch 106 transfers an address included signal according to the address included signal to select one of the memory 103, the voltage regulator 104 and the network interface controller 105 to connect with the switch 106. Moreover, the switch 106 switches between the BMC 101 and the SOC 102 to connect with the switch 106 by a control signal. The control signal is provided by the BMC 101 or SOC 102. In other words, by the switch 106, one of the memory 103, the voltage regulator 104 and the network interface controller 105 can be connected to the BMC 101 or the SOC 102 to work as a slave device to perform a corresponding function process. In an embodiment, the switch is a multiplexer. For example, the switch 106 transfers an address included signal to select the voltage regulator 104 to supply power to the SOC 102. The SOC 102 may monitor the voltage value of the voltage regulator 104. At this time, a control signal switches the switch 106 to make the voltage regulator 104 to connect with the BMC 101. Then, the BMC 101 may monitor the temperature of the voltage regulator 104. In another embodiment, the switch 106 transfer an address included signal to select the memory 103. Then, a control signal sequentially switches the switch 106 to make the SOC 102 and the BMC 101 sequentially connect to the memory 103. Therefore, through the switch 106, the data in the memory 103 is respectively accessed by the SOC 102 and the BMC 101. For example, when the server 100 is on standby power status, the BMC 101 receives data in the memory 103 through the switch 106. When the server 100 is powered on, the switch 106 switches the SOC 102 to receive data in the memory 103. In further embodiment, the switch 106 transfer an address included signal to select the network interface controller 105 to be connected to the BMC 101. Then, the BMC 101 may monitor the temperature of the network interface controller 105. Then, a control signal switches the switch 106 to make the SOC 102 to be connected with the network interface controller 105. For the network interface controller 105 also connected with SOC 102 through PCIE port, Then, the SOC 102 may access the temperature and PCIE related information of the network interface controller 105. Accordingly, by switching the switch 106, one of the memory 103, the voltage regulator 104 and the network interface controller 105 can be connected to the BMC 101 or the SOC 102 to perform a corresponding function process. On the other hand, the server 200 further comprises a demultiplexer 107. The BMC 101 may select one of the calculation modules 112 through the demultiplexer 107.

Figure 3:
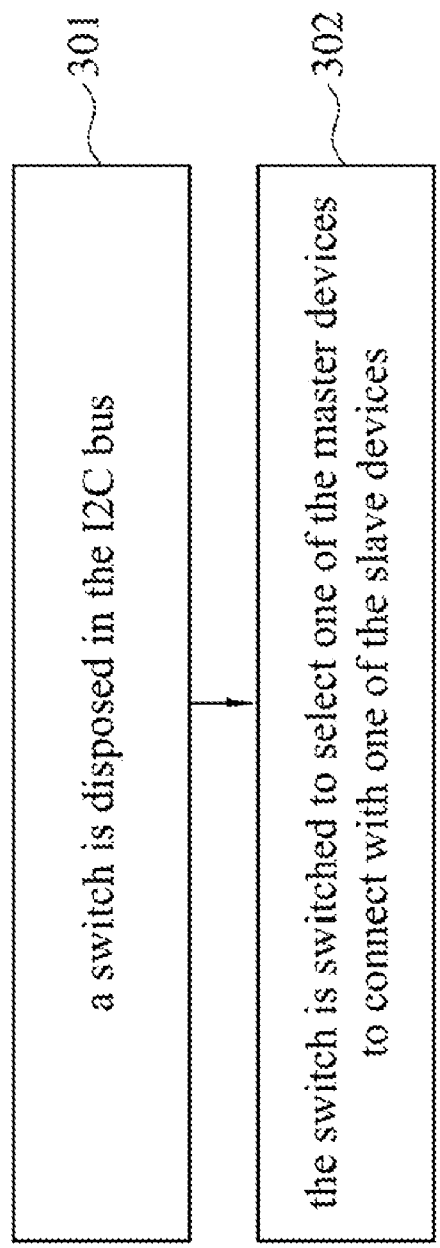
FIG. 3 illustrates a flow chart for selecting a slave device in an I2C bus according to an embodiment of the invention.

FIG. 3 illustrates a flow chart for selecting a slave device in an I2C bus according to an embodiment of the invention. Please refer to the FIG. 2 and FIG. 3. In an embodiment, the I2C bus comprises the memory 103, the voltage regulator 104 and the network interface controller 105 working as slave devices and the BMC 101 and the SOC 102 working as master devices. First, in step 301, a switch is disposed in the I2C bus. For example, a switch 106 is disposed in the I2C bus to make the memory 103, the voltage regulator 104 and the network interface controller 105 be connected to the SOC 102 and the BMC 101 through the switch 106. Next, in step 302, the switch is switched to select one of the master devices to be connected with one of the slave devices. For example, the switch is switched to select one of the SOC 102 and the BMC 101 to be connected with one of the memory 103, the voltage regulator 104 and the network interface controller 105 to perform a function process.

Accordingly, the slave devices are connected to the master devices through a switch. By switching the switch, different master devices are selected to be connected with the slave devices respectively. Therefore, different functions are performed for the master devices.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:
1. A server system, comprising:
a baseboard management controller;
a plurality of calculation modules, each of the calculation modules comprising:
    a system on chip;
    a plurality of slave devices; and
a switch connected with the baseboard management controller, the system on chip and the slave devices;

wherein the baseboard management controller and the system on chip are master devices of an I2C bus, and the slave devices are slave devices of an I2C bus, wherein the switch not only selects one of the baseboard management controller and the system on chip but also selects one of the slave devices to be connected together;

wherein the switch transfers an address included signal to select one of the slave devices to be connected with the switch, and the switch switches between the baseboard management controller and the system on chip according to a control signal to make one of the baseboard management controller and the system on chip be connected with one of the slave devices.

2. The server system of claim 1, wherein one of the slave devices is a memory, and when a server is on standby power status the baseboard management controller receives data stored in the memory through the switch, and when the server is powered on the switch switches the system on chip to receive data stored in the memory.

3. The server system of claim 1, wherein one of the slave devices is a network interface controller; the baseboard management controller monitors the temperature of the network interlace controller, and the switch switches the system on chip to access the temperature of the network interface controller.

4. The server system of claim 1, wherein one of the slave devices is a voltage regulator which supplies power to the system on chip and the system on chip accesses a voltage value of the voltage regulator, and the switch switches the baseboard management controller to monitor the temperature of the voltage regulator.

5. The server system of claim 1, further comprising a demultiplexer, wherein the baseboard management controller is connected with the calculation modules through the demultiplexer.

6. The server system of claim 1, wherein the switch is a multiplexer.

7. The server system of claim 1, wherein the baseboard management controller or the system on chip transfer the address included signal to the switch.

8. The server system of claim 1, wherein the switch connected with the baseboard management controller, the system on chip and the slave devices respectively by I2C bus.

9. The server system of claim 1, wherein the baseboard management controller and the system on chip are master devices.

10. The server system of claim 1, wherein the control signal is provided by the baseboard management controller or system on chip.

* * * * *